United States Patent [19]
Ruben

[11] 3,876,155
[45] Apr. 8, 1975

[54] DRIP-TYPE IRRIGATION EMITTER

[75] Inventor: Raymond R. Ruben, Mission, Tex.

[73] Assignee: BPG Company, Inc., Mission, Tex.

[22] Filed: Sept. 27, 1973

[21] Appl. No.: 401,339

[52] U.S. Cl. .................. 239/542; 239/66; 239/266; 239/288.5; 239/574; 239/583; 137/119

[51] Int. Cl. .......................... B05b 1/14; B05b 15/00

[58] Field of Search ......... 239/66, 67, 76, 266, 267, 239/268, 288.3, 288.5, 443, 542, 570, 574, 239/569, 583; 137/119

[56] References Cited
UNITED STATES PATENTS

| | | | |
|---|---|---|---|
| 3,119,403 | 1/1964 | Stilwell et al. | 239/66 X |
| 3,144,038 | 8/1964 | Stilwell | 239/66 X |
| 3,502,270 | 3/1970 | Prencipe | 239/542 X |
| 3,685,735 | 8/1972 | Foster | 239/542 X |
| 3,693,888 | 9/1972 | Rondas et al. | 239/542 X |

*Primary Examiner*—Robert S. Ward, Jr.

[57] ABSTRACT

A basic emitter unit designed for automatic self-flushing and drip operation, but which can be readily modified by adding parts to convert it to a combination drip irrigation emitter and mister for spraying finely divided particles of heated water into the air to warm the air to prevent frost damage to plants, trees, etc. By the substitution of differently designed orifice discs, the basic emitter unit can be made self-flushing and to provide misting only, or to be self-flushing and function as an unlimited-pressure mister. By alternative minor disc modification, the basic emitter unit can be connected at the end of an irrigation line to effect flushing of the line only.

The basic emitter unit is further characterized by its capability of (1) automatically compensating for variations in line pressure and changes in elevation of terrain; (2) maintaining a uniform flow rate regardless of variations in line pressure; (3) eliminating the necessity of water filtration; (4) when connected with other emitters in an irrigation line, taking advantage of line friction and enabling flushing and seating of the emitters progressively under very low line pressure; and (5) eliminating the need for a dual pump system.

24 Claims, 19 Drawing Figures

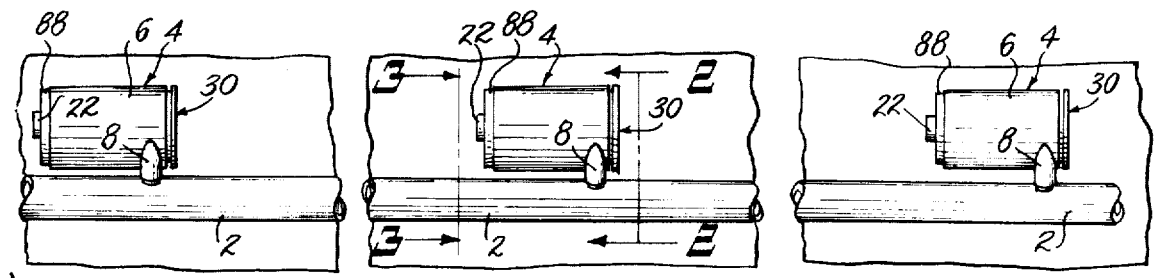
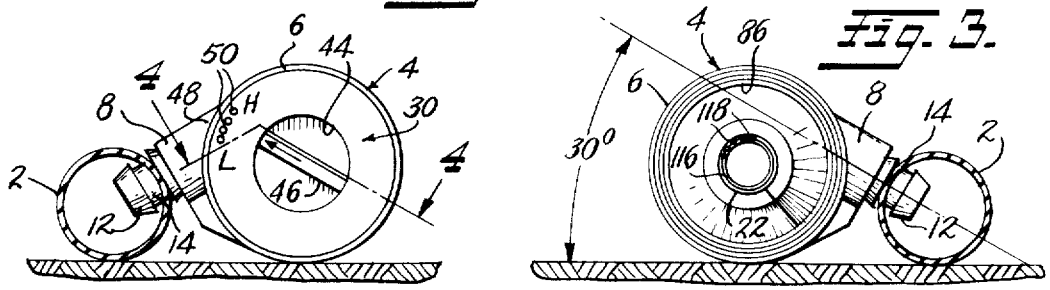
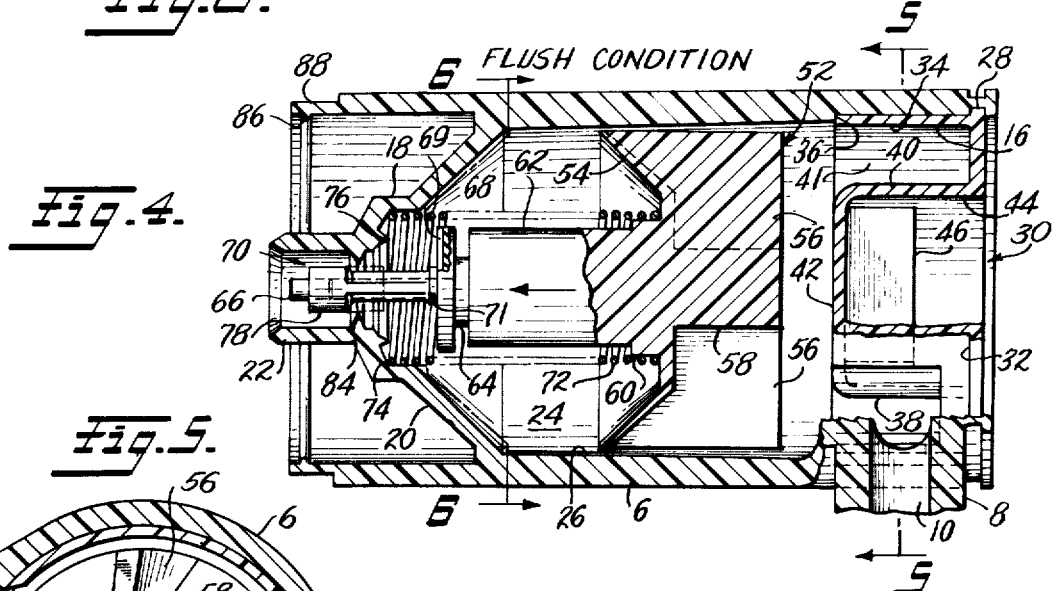
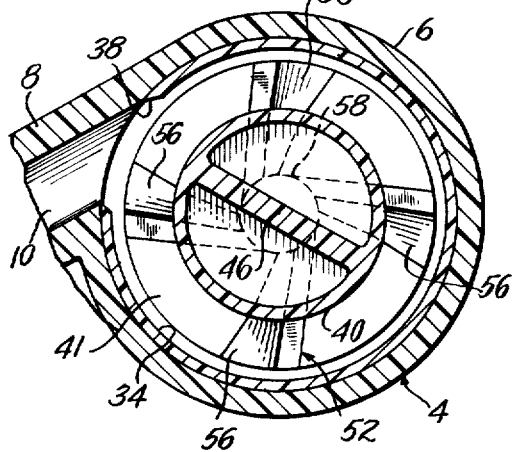
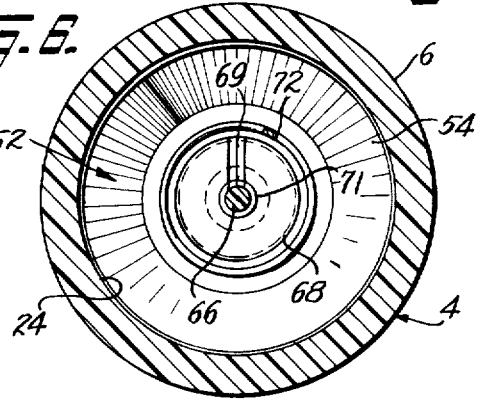

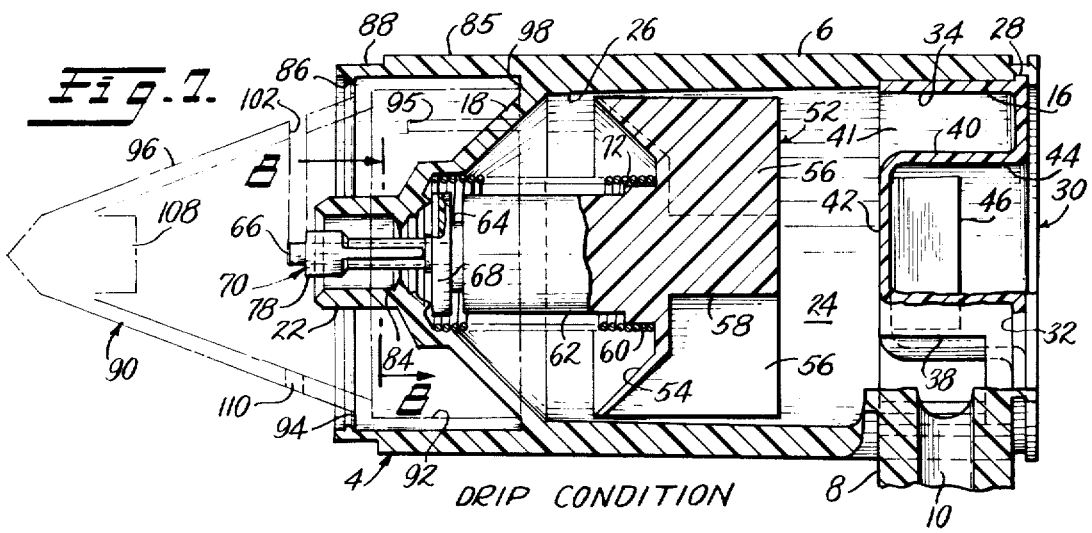
Fig. 7. DRIP CONDITION
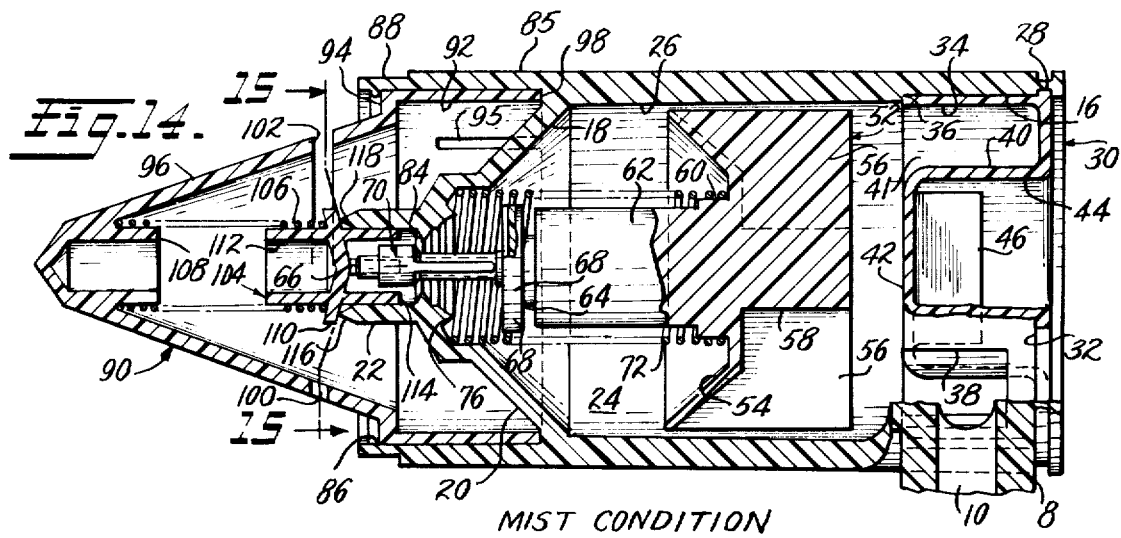
Fig. 14. MIST CONDITION
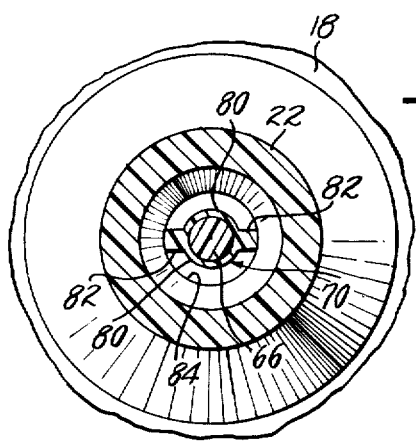
Fig. 8.
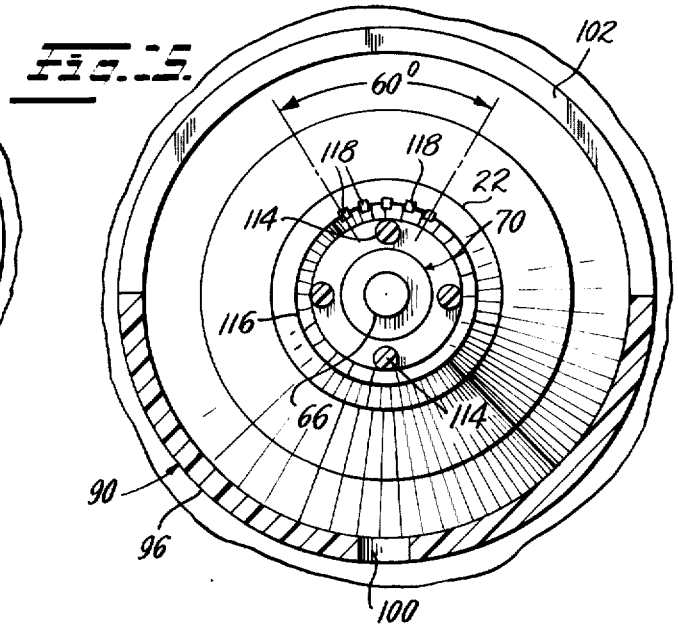
Fig. 15.

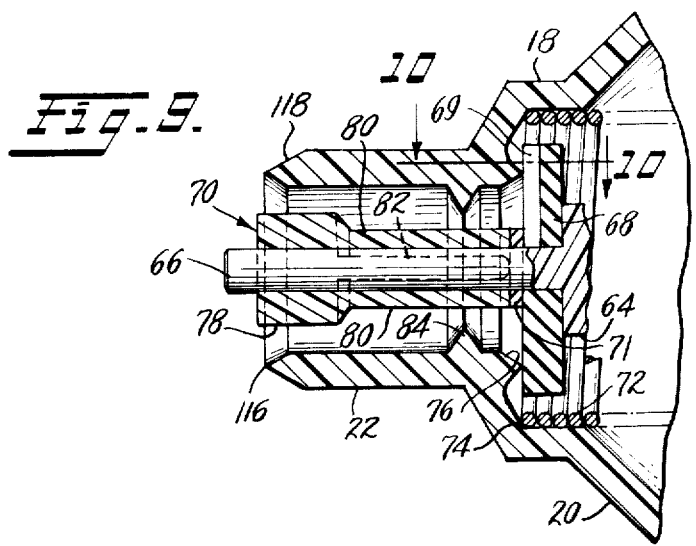
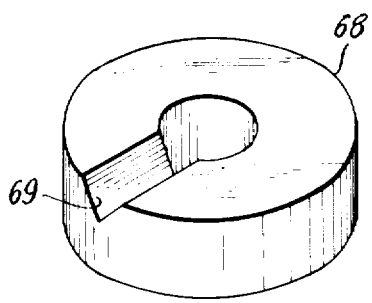
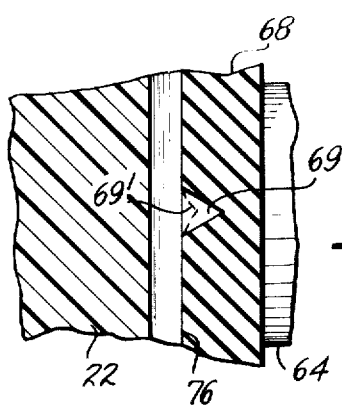
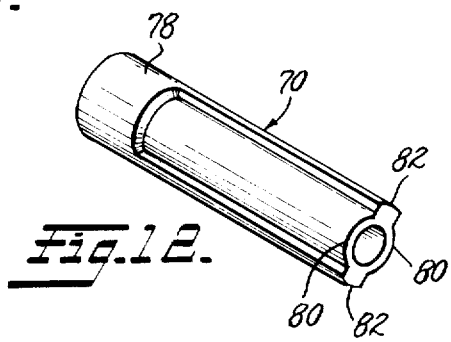
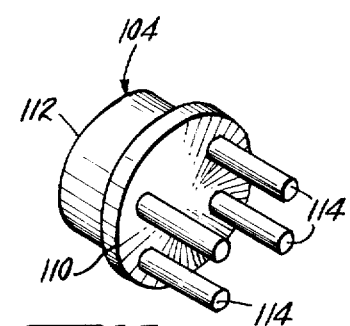
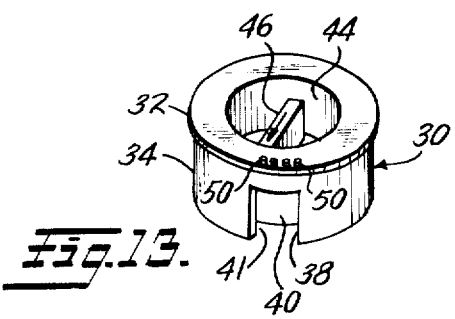

DRIP-TYPE IRRIGATION EMITTER

BACKGROUND OF THE INVENTION

1. Field of the Invention

The present invention relates to emitter type irrigation devices and more particularly to a versatile basic emitter unit that is self-flushing, pressure compensating and readily adaptable for effecting a variety of irrigation functions.

2. Description of the Prior Art

Various forms of drip and mist irrigation emitters have bee provided heretofore, but most of these are unsatisfactory because they require a high degree of filtration of the water, which is usually inadequate to overcome the inherent tendency to periodically become clogged by sediment, debris and other impurities carried by the water, which obstruct flow, thus requiring frequent servicing of the emitters. Another objection to prior emitters is that, in order to effect flushing, it is necessary to provide line pressure and water capacity several times greater than that required for effecting irrigation alone. The differences in the two pressures is such that some irrigation systems require a dual pumping system, one for providing water at a lower pressure suitable for irrigation. Still another objection to prior irrigation emitters is that they are wasteful and do not include any means for controlling the initial rate of flow of water therethrough; nor any means for automatically compensating for variations in line pressure, which cause uneconomical and undesirable variations in the rate of flow from the emitters.

SUMMARY OF THE INVENTION

The emitter of the present invention overcomes the foregoing objections to prior irrigation emitters in that it comprises a basic unit that is automatically self-flushing and pressure-compensating. The emitter comprises a housing containing a sediment collecting chamber wherein sediment is collected during an irrigation cycle. Flushing of sediment from such chamber is positively effected by a rotating agitator mounted within the chamber and operating on the principles of a turbine to effect flushing at the start of each irrigation cycle. The present emitter also includes simple orifice means formed in a diaphragm or orifice disc mounted on the agitator. The orifice disc is provided with a metering groove and is made of resilient material so that when the disc is seated, variations in line pressure above a given pressure will affect the cross-sectional area of the groove so that as the pressure increases, the rate of flow of water is correspondingly, reduced, so that a substantially uniform flow rate is maintained throughout an irrigation cycle. Usually, the flow rate is restricted to about two gallons per hour per emitter. The basic emitter also includes a spool valve that is mounted on the agitator. In addition to being rotatable, the agitator is also axially movable in the housing in accordance with variations in pressure and includes a peripheral wall that cooperates with the tapered wall of the sediment chamber in the emitter housing to provide a slight back pressure in the sediment chamber. The spool valve is movable within the main nozzle of the emitter by the agitator. The spool valve and the nozzle are designed to initially obstruct flow to conserve water and to effect a sudden release of the back pressure to provide a pulse or surge that effectively flushes undesirable solids from the tapered chamber. After flushing, the orifice disc engages a seat surrounding the inner end of the orifice nozzle and permits flow at a rate to provide drip irrigation.

The emitters constructed in accordance with the principles of the present invention have most of the components molded from strong plastic material, such as polyvinyl chloride. Such parts are designed so that they can be fabricated by extrusion presses and readily assembled and disassembled without the use of tools. The basic components of the emitter consist of a one-piece housing having a discharge nozzle at one end, an adjustable plug at the other end, including means for controlling the rate at which water can be admitted into the emitter housing, an agitator having spirally arranged blades designed so that the agitator rotates continuously like the rotor of a turbine in response to water flow through the housing, a spool valve mounted on and rotatable with the agitator, and cooperable with the discharge nozzle, for controlling the flow of water therethrough during the self-flushing stage of the emitter, an orifice valve disc mounted on the agitator inwardly of the spool valve and having a radial groove that cooperates with a seat surrounding the inner end of the discharge nozzle, and which groove functions as an orifice to control the rate of flow through the nozzle for drip irrigation, and a light compression spring disposed between the agitator and the discharge nozzle and rotatable with the agitator for creating yieldable resistance to axial movement of the agitator. Rotation of the agitator is facilitated by the introduction of water into the emitter housing for flow in a generally spiral pattern.

Additional components, such as a cover (at the nozzle end of the housing), a diaphragm pellet, or mist valve, and a compression spring, can be added to the basic unit to produce a fine mist as an alternative to drip irrigation. The cover can be added to the basic emitter unit without the diaphragm pellet and spring, to serve as a closure for preventing dirt and insects from getting into the discharge nozzle. Various types of resilient orifice discs, preferably made of rubber, can be substituted in the basic emitter unit to convert the same to effect other functions. For example, for misting alone, any desired number of radial metering grooves can be formed in the orifice disc, preferably equal in number and having a total cross-sectional area equal to that of the notches formed on the discharge end of the nozzle. The basic emitter unit can also be converted to a flushing unit by omitting the metering groove in the orifice valve altogether. In such instance, the emitter would preferably be installed at the end of the irrigation line, since there is an inherent tendency for sediment to accumulate at such location.

Accordingly, the principal object of the invention is to provide an emitter that is automatically both self-flushing and pressure-compensating.

Another important object is to provide a basic, versatile emitter designed so that it is capable of being adapted to achieve the following functions, or combinations of functions, namely:

1. Flush the emitter and then drip irrigate.
2. Provide a mist, flush the emitter, and then drip irrigate.
3. Provide only a mist.
4. Operate only to flush the irrigation line.

Another object is to provide an emitter that will function reliably without clogging, and without requiring previous filtration of the water.

Another object is to provide an irrigation emitter including automatic means for controlling the initial flow of water through the emitter.

A further object is to provide an irrigation emitter designed so that automatic flushing is effected at the beginning of each irrigation cycle, and wherein foreign solid matter is positively flushed from a sediment cavity in the emitter housing by the rotary action of an agitator therein (induced by the continuous flow of water through the emitter) and which agitator aids in creating an initial back pressure, which upon release, produces a pulse or surge for flushing out any solid matter collected in said cavity.

Still another object is to provide an emitter wherein the movement of the sediment particles is effected by a controlled, centrifugal flow of water through the emitter promoted by an eccentric inlet port and the rounded internal wall surface within the housing of the emitter, so as to provide a flow path simulating a cyclone effect.

A further object is to provide an irrigation emitter wherein solids carried into the emitter housing by the irrigation water during an irrigation cycle are strained out and trapped in a sediment cavity in the housing and are automatically flushed out at the start of the next irrigation cycle.

A still further object is to provide an irrigation emitter having an orifice valve that will automatically compensate for variations in pressure due to changes in elevation of terrain and/or variations in the pressure in the irrigation line itself.

Another further object is to provide an irrigation emitter that will maintain a substantially uniform rate of flow through the emitter during the entire irrigation cycle, regardless of line pressure variations.

Another object is to provide an irrigation emitter that is self-flushing and which can be adjusted to selectively provide for either drip emission or for emitting a fine mist.

Still another object is to provide a basic irrigation emitter that can be readily adapted to perform different irrigation functions by substituting different forms of diaphragm discs therein and/or by adding parts thereto.

A further object is to provide an irrigation emitter in which progressive flushing of the emitters connected with the irrigation line is automatically effected by the back pressure produced by friction in the irrigation line itself.

A still further object is to provide an emitter that is designed to be connected with a supply line in offset relation so that a back-flow condition cannot be created that would return sediment to the supply line after the system has been shut down.

Still another object is to provide an emitter designed to accomplish a progressive flushing sequence in an irrigation line having a plurality of emitters connected therein, without requiring an unduly high line pressure or a dual pumping system.

Other and further objects of the invention will be apparent from the following description taken in conjunction with the accompanying drawings.

DESCRIPTION OF THE DRAWINGS

FIG. 1 is a diagrammatic plan view showing a series of emitters embodying the present invention mounted in an irrigation hose.

FIG. 2 is a right end view of one of the emitters, as viewed on the section line 2—2 of FIG. 1, particularly showing the position that the emitter assumes relative to the ground when in use.

FIG. 3 is a left end view of the emitter, as viewed on the section line 3—3 of FIG. 2.

FIG. 4 is an enlarged longitudinal sectional view through the basic emitter, taken on the staggered section line 4—4 of FIG. 2, and showing the spool valve and the orifice valve in the position they assume during flushing of the emitter.

FIG. 5 is a fragmentary vertical sectional view, taken on the section line 5—5 of FIG. 4, and particularly showing the angular arrangement of the blades of the agitator.

FIG. 6 is a vertical sectional view, taken on the staggered section line 6—6 of FIG. 4, and particularly showing the radial groove in the orifice valve.

FIG. 7 is a view similar to FIG. 4, but showing the orifice valve in seated position for drip irrigation.

FIG. 8 is a fragmentary vertical sectional view through the emitter nozzle and spool valve, taken on the section line 8—8 of FIG. 7.

FIG. 9 is a further enlarged fragmentary longitudinal sectional view through the discharge nozzle, spool valve and the seated orifice valve.

FIG. 10 is a greatly enlarged fragmentary horizontal sectional view, taken on the section line 10—10 of FIG. 9, particularly showing the relationship between the groove in the orifice valve and the valve seat.

FIG. 11 is a perspective view of the orifice valve.

FIG. 12 is a perspective view of the spool valve.

FIG. 13 is a perspective view of the adjustable end plug that is mounted in the body of the emitter.

FIG. 14 is a longitudinal sectional view though the basic drip emitter to which has been added a diaphragm pellet, or mist valve, a spring and a cover for converting the emitter to a combination mister and drip emitter.

FIG. 15 is an enlarged vertical sectional view, taken on the section line 15—15 of FIG. 14, and particularly showing the mist notches in the outer end of the discharge nozzle, and the opening in the cover for drip irrigation and the arcuate slot in the cover for discharging the mist.

FIG. 16 is a perspective view of the mist valve or diaphragm pellet.

DESCRIPTION OF THE PREFERRED EMBODIMENTS

Figure 17:
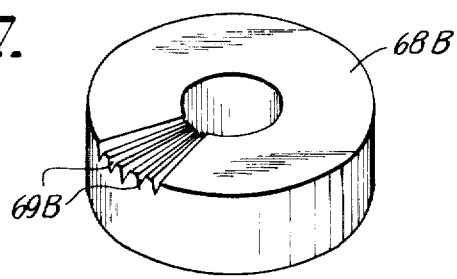
FIG. 17 is a perspective view of an orifice disc provided with a plurality of radial grooves for use in an unlimited-pressure mister.
Figure 18:
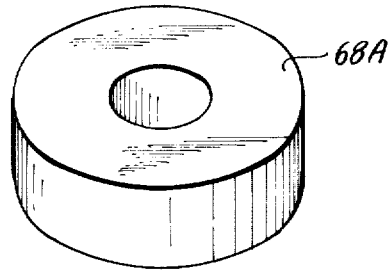
FIG. 18 is a similar view of a plain orifice disc for use in a flushing emitter.

Referring now to FIG. 1 of the drawings, the numeral 2 identifies an irrigation line, which may be a rubber or plastic hose. A plurality of irrigation emitters 4 is connected in the line 2 at suitably spaced intervals, for example, 12 feet apart in citrus orchards.

FIGS. 2 and 3 illustrate the normal angular relationship between the hose 2, the emitters 4 and the ground.

Each emitter comprises a plastic housing 6 having a tangential extension 8 containing a passage 10 serving as a water inlet. The extension 8 has a tapered end 12 and a reduced neck portion 14 adjacent thereto. In mounting the emitter 4 in the hose 2, an opening of predetermined size is cut in the hose 2 and the tapered end of the inlet is forced into the opening, as will be readily understood. The size of the opening and the neck 12 are such that a tight seal is formed between the hose 2 and the extension 8.

Referring to FIG. 4, the emitter 4 comprises the housing 6 which is externally cylindrical and has a cylindrical opening 16 at one end thereof. The housing 6 contains a transverse wall 18 including a conical portion 20 that merges into a discharge nozzle 22. A sediment cavity 24 is formed in the housing 6 between the cylindrical inlet 16 and the wall 18 and is defined by a side wall portion 26 that is tapered to gradually decrease in diameter in a direction away from the opening 16 toward the wall 18. The tapered cavity 24 is a feature of major importance, as will be pointed out later.

A shallow groove 28 is formed in the inner side of the wall defining the cylindrical opening 16 adjacent the entrance thereof. A plastic plug 30 fits tightly in the opening 16 and forms a seal therewith. A flange 32 on the plug 30 seats in the groove 28 to retain the plug in place. The plug 30 comprises an outer cylindrical wall 34, the inner end of which seats against a shoulder 36 at one end of the tapered cavity 24. The plug wall 34 has a notch 38 formed therein for controlling the flow of water through the inlet passage 10 into the housing 6. The plug 30 has a continuous inner wall 40 that is concentric with the wall 34 and cooperates therewith to form an annular channel 41. The wall 40 merges into a transverse wall 42 that forms the bottom of a recess 44 in the plug 32. A web 46 extends diametrically across the recess 44, FIG. 2, and has an arrow molded therein extending in a direction toward the outer periphery of the housing 6 and toward an indexing rib 48 molded on the exterior of the housing 6. The plug 30 has a series of projections 50 extending therefrom and located in juxtaposition to the notch 38. The letter H (designating high flow) is formed on the plug at one end of the row of projections 50 and the letter L (designating low flow) is formed at the opposite end. The projections 50 can be selectively radially aligned with the indexing rib 48 for obtaining the desired extent of alignment of the notch 38 with the inlet passage 10 to control the rate at which water can flow into the housing 6. The plug 30, while it fits tightly in the housing 6, can nevertheless be readily turned by engaging a suitable tool with the diametrical web 46.

Disposed within the tapered cavity 24 is an agitator 52, which comprises a dished or conical flange 54, the periphery of which cooperates with the tapered wall 26 of the cavity 24 to build up a back pressure within the cavity. The agitator 52 includes four spiral blades 56 that extend generally tangentially from a cylindrical hub 58. As is shown in FIG. 4, the side edges of the blades 56 are disposed adjacent the annular channel 41 in the plug 30, so that water flowing in a spiral pattern from the channel impinges against the blades 56 to effect continuous rotation of the agitator 52.

The agitator 52 further includes axial extension portions 60, 62, 64, and 66, which decrease in diameter in a direction away from the flange 54. A resilient rubber diaphragm valve, or orifice disc, 68 is mounted on the extended portion 66 and bears against the end of the extension 64. The orifice disc 68 has a V-shaped radial metering groove 69, best shown in FIG. 11. A spool valve 70 has a tight fit on the extension 66 and is mounted with its inner end engaging a rubber washer 71 to hold the orifice disc 68 in place. A compression spring 72 has one end thereof surrounding the extension 60 and engaging the flange 54, with its other end engaging a shoulder 74 surrounding a knife-edge seat 76 forming the inlet to the discharge nozzle 22.

The spool valve 70 is best shown in FIG. 12 and comprises a hollow plastic tube that has a cylindrical end portion 78 and a pair of channels 80 extending lengthwise from said cylindrical portion and forming diametrically opposed ribs 82. The cylindrical end portion 78 and the channels 80 are of predetermined relative length in order to provide desired flow functions described more fully hereinafter.

The tapered cavity 24 functions as a settling chamber in which sediment or other solid matter carried by the irrigation water is deposited during the operating cycle of the irrigation system. The cavity 24 is disposed parallel with the supply line 2, as will be understood from FIG. 1. Further, the extension 8 containing the inlet passage 10 is inclined on an angle of about 30 degrees to the ground. The purpose of this is to provide an antisiphon arrangement that will prevent back flow into the supply line 2 after the system has been shut down. This feature is of particular advantage in case any foreign matter has settled in the cavity 24 during a drip cycle, which involves a semi-static flow condition.

In the normal operation of the emitter 4, water will enter the emitter through the inlet passage 10 and the plug notch 38 in an eccentric direction because of the offset relation of the extension 8 to the axis of the emitter. The input flow is directed spirally by the plug walls 34 and 40 defining the annular channel 41, thereby causing a flow path similar to a cyclone. The input volume of flow is regulated by the area of the notch 38 aligned with the inlet passage 10, in proportion to the clearance area between the agitator flange 54 and the tapered wall 26 defining the surface of the cavity 24. This relationship is quite critical because the difference between the area of the input notch 38 and the clearance area between the periphery of the flange 54 and the wall surface 26 produces a differential pressure force that is effective to move the agitator 52 bodily along the center line of the emitter 4. The rate of movement is controlled by the compression of the spring 72 and the longitudinal taper of the cavity surface 26.

As the agitator 52 moves axially, the clearance between the flange 54 and the tapered cavity surface 26 becomes less. This restricts the flow, thereby increasing the pressure acting on the pressure side of the flange 54. Such increase in pressure is needed to overcome the resistance of the spring 72, which increases as the spring is compressed. While the agitator 52 is being moved axially, it is also being rotated by the pressure of the water acting on the blades 56 and by the centrifugal or spiral flow caused by the eccentrically arranged input notch 38, and the rounded internal surfaces of the walls 34 and 40 defining the annular channel 41. The increased resistance of the spring 72 causes a forced lag in the axial movement of the agitator 52, which provides the necessary time delay for the controlled flow of water to clean the interior of the cavity 24 and to flush the orifice disc 68. As this lagging action is taking place, the agitator 52 continues its travel and rotation with water flowing through the cavity 24 and discharging through the nozzle 22. As the orifice disc 68 approaches the seat 76, a definite restriction in flow occurs with an increased velocity of the escaping water and a consequent high friction resistance across the inlet of the nozzle 22 and across the seating face of the orifice disc 68, which greatly aids the removal of foreign particles that may have settled in the metering groove 69.

The spool valve 70 plays an important function during this phase of emitter operation. Thus, the initial entry of water into the cavity 24 must be strictly controlled to conserve water for operation within the capacity of the system. Specifically, the function of the spool valve 70 is coordinated to retain the initial charge of water in the cavity 24 by having the cylindrical end portion 78 thereof confront an inwardly projecting ridge 84 located adjacent to the inlet end of the discharge nozzle 22. As the cylindrical portion 78 moves past the inwardly projecting ridge 84, there is a sudden release or gushing of the water through the emitter to flush the cavity 24. The water than flows through the channels 80 in the spool valve 70, the ribs 82 continuing to engage the ridge 84 and to serve as a guide for the agitator 52. The diameter and length of the cylindrical portion 76 of the spool valve 72 relative to the ridge 84, and the diameter and length of the indented portions providing the channels 80, are proportioned to provide the necessary time delay to fill the cavity 24 with water and to properly time the sudden release of the initial charge of water.

Continuing with the description of the operation of the emitter 4, axial movement of the agitator 52 will continue during flushing until the seating face of the orifice disc 68 contacts the knife-edge seat 76, whereupon the flushing state is completed. The drip stage starts simultaneously after flushing with the seating of the orifice disc 68 against the seat 76. It will be understood that an orifice is formed by the metering groove 69 at the time that the orifice disc 68 engages the knife-edge seat 76. The purpose of such seat is to provide as short a distance as possible for water-carrying sediment to escape from the cavity 24. Obviously, the longer the orifice passage, the more friction promoting adhesion for deposit of matter is likely to occur, and, therefore, cause clogging of the orifice.

It will also be clear that, since the orifice disc 68 is made of resilient material, as the pressure varies in the cavity 24, the pressure on the orifice disc 68 will correspondingly vary, with the result that the metering groove 69 will become distorted and be reduced in effective cross-section area, as shown in dot-and-dash lines 69' in FIG. 10, so that the flow across the seat 76 will decrease proportionately as the pressure on the orifice disc 68 increases. Water that has passed through the orifice in the orifice disc 68 can flow along the grooves 80 in the spool valve 70 and discharge from the end of the nozzle 22 to provide a drop-by-drop emission, normally at the rate of about two gallons per hour.

In connection with the foregoing, it will be understood that the metering groove 69 in the orifice disc 68 is of a predetermined size and is preferably triangular or wedge-shaped in transverse cross-section. Therefore, upon engagement of the orifice disc 68 with the seat 76, a triangular-shaped restriction, or orifice, is formed. Due to the resilience of the disc material, high pressure in the cavity 24 will distort the diaphragm material and cause the wedge-shaped groove to change its shape and decrease in size. The seat 76 is purposely formed as a knife-edge to reduce to a minimum the bearing area of engagement between the orifice disc 68 and the seat. This lessens the possibility of sediment adhesion thereto and makes the resilience of the disc material highly sensitive, thereby enabling the same to proportion the orifice area to compensate for the existing pressure condition in the cavity 24.

The object of compensating for variations in pressure is to provide a constant or stable rate of drip emission that is not influenced by varying pressure conditions. The maintenance of the constant flow cannot be sustained for an excessively wide range of pressure variations, although it is desirable to be able to do so for line pressures ranging from about 5 to 50 p.s.i. This is difficult to achieve, but the design of the present basic emitter is capable of maintaining such uniform flow with a plus or minus 10 p.s.i. from the desired optimum.

It will be understood that, following the drip irrigation cycle, after the supply of water to the line 2 is cut off, the spring 72 will return the agitator 52 to its initial position wherein the hub 58 engages the wall 42 of the plug 30. At such time, the spool valve 70 will be retracted to a position in which its cylindrical portion 78 cooperates with the ridge 84 to obstruct the passage in the nozzle 22.

Referring to FIG. 7, the housing 6 has a cylindrical wall portion 85 surrounding the outer end of the discharge nozzle 22. An internal bead 86 is formed on the wall 85 near its outer end, and the outer diameter of the wall in the region of the bead is reduced in thickness by forming a groove 88 therein to render the same flexible. As is illustrated in dot-and-dash lines, a plastic cover 90 may be mounted on the housing 6 to enclose the nozzle 22 and prevent dirt, insects, or other foreign matter from entering the housing. The cover 90 has a cylindrical wall 92 that has a close fit with the wall 85 and terminates in a shoulder 94. The wall 92 is slit at 95 to permit contraction to facilitate mounting in the housing 6. A conical portion 96 extends outwardly from the shoulder 94 and its base is of smaller diameter than the bead 86. Consequently, when the cover 90 is mounted in place, the shoulder 94 is disposed just inwardly of the bead and is retained in place by the bead. The inner edge of the wall 92 engages a seat 98 at the juncture of the transverse wall 18 with the housing wall, so that the cover 90 is securely held in place in the housing 6. The conical portion 96 has a small transverse opening 100 through which water can be emitted for drip irrigation. The conical portion 96 also has a semi-circular slot 102 that serves as a mist outlet, as will be explained later.

The use of the cover 90 is optional in a drip emitter. However, in order to convert the basic drip emitter unit 4 into a mister, or mist-forming device, a mist valve, or diaphragm pellet, 104 is mounted in the nozzle 22, FIG. 14, and a light compression spring 106 has one end thereof positioned against the pellet and both are enclosed by the cover 90, with the opposite end of the spring 106 surrounding a cylindrical boss 108 formed interiorly at the apex of the conical cover 90. The diaphragm pellet 104 is best shown in FIGS. 14 and 16 and comprises a cone-shaped wall 110 having a hollow cylindrical portion 112 extending outwardly therefrom. A plurality of guides 114 extend from the opposite face of the wall 110 and serves as means for guiding axial movement of the pellet relative to the nozzle 22. The discharge end of the nozzle 22 is in the form of a knife-edge seat 116, which is engageable by the wall 110 of the diaphragm pellet 104. It will be understood that the spring 106 continually urges the diaphragm pellet 104 toward the seat 116.

As is best shown in FIG. 15, the sharp edge of the seat 116 has a plurality of transverse notches 118 formed therein, extending over an angular portion of the seat, comprising an included angle of about 60°. When the wall 110 of the diaphragm pellet 104 engages the edge of the seat 116, the notches 118 are converted into a multiplicity of minute orifices. It will be noted that when the diaphragm pellet 104 is seated, the upper portion of the inner surface of the conical wall 110 is directed toward the mist slot 102. The multiple small orifices are preferred to a single large orifice because they divide the output flow for finer particle emission. The finer the water particle, the more efficient the heat transfer to the ambient air. The particles are preferably fine enough to be discharged through the slot 102 into the air in the form of a fine mist. The formation of the mist is particularly effective when formed from preheated water discharged in a manner to surround or envelop a plant or tree. Transferring the heat from the water to the air through the medium of a fine mist will greatly increase the probability of protecting the plant or tree against frost damage during sub-freezing temperatures. It will be understood that during a mist-forming operation, the maximum flow of water through the emitter is limited by the size of the orifice notches 118.

To effect a mist cycle, the plug 30 is adjusted so that the flow of water through the emitter 4 is limited to correspond to a pressure value which is insufficient to cause the agitator 52 to travel axially a sufficient distance to engage the orifice disc 68 with the knife edge seat 76. Under this condition, which is illustrated in FIG. 14, the flow of water is uniform and continuous and passes through the emitter 4 and is discharged through the multiple orifices 118 at the end of the nozzle 22, the diaphragm pellet 104 then being engaged with the knife-edge seat 116 on the end of the nozzle 22, as previously described. The compression spring 106 retains the diaphragm pellet 104 in position on the nozzle 22 and supplies sufficient resistant force to the flow to retain the diaphragm pellet seated.

With the emitter shown in FIG. 14, in order to make the transition from mist operation to the drip stage, all that is required is an increase in flow pressure, sufficient to override the diaphragm pellet spring 106. Flushing will take place as the flow, due to increased pressure, floods the cavity 24 and is released in the form of a burst, as the force of the spring 106 is overcome and the diaphragm pellet 104 is disengaged from its seat 116. An increase in pressure can be effected by simply adjusting the plug 30 to position the notch 38 in a lesser flow obstructing position.

When the pressure reaches a sufficiently high value, the agitator 52 will have traveled axially sufficiently to seat the orifice disc 68 on the knife-edge seat 76, as previously described. So long as this pressure is held in the cavity 24, the emitter will remain in its drip stage. The diaphragm pellet 104 will be reseated by the spring 106. The escape by drop-by-drop emission of the water now occurs out of the nozzle 22 and through the mist orifices 118, since the combined area of the multiple orifices 118 is greater than the area of the metering groove 69 in the orifice disc 68. The water will finally discharge from the emitter through the opening 100 in the cover 90.

The emitter assembly can be converted to a solely misting device by simply omitting the metering groove 69 from the orifice disc 68. Such plain disc is identified by the numeral 68A in FIG. 18.

The basic emitter unit 4 can be converted into an unlimited-pressure misting device by forming the same size and number of metering grooves of comparable cross-sectional area in the orifice disc, as are provided in the seat 116 at the end of the discharge nozzle 22. Such a disc is indicated at 68B in FIG. 17, and contains five metering grooves 69B.

In some installations, it is desirable to provide a device that will serve only to flush foreign matter from the irrigation line. Thus, the basic emitter unit 4 shown in FIG. 1 can be converted into an automatic line flusher simply by omitting the metering groove 69 in the orifice disc 68. The disc 68A, FIG. 18, would serve this purpose. Such emitter would be useful at the end of the irrigation line in case of extraordinarily heavy line sediment to reduce the burden of flushing on the remaining emitters in the line. Line sediment tends to be heaviest at the end of the line because of static flow accumulation and therefore a flushing device located at the end of the line is highly advantageous.

In all types of emitters described and illustrated herein, the spring 72 has functions other than to supply resisting force to the axial movement of the agitator 52. The number of turns are predetermined and when the spring is compressed, FIG. 7, they form a strainer to protect the metering orifice 69 from entry of foreign particles that would be too large to flow through the orifice. Also, the spring 72 is secured to the agitator 52 and rotates with it to diffuse and assist in the breaking up of soft, larger, unwanted particles. When the spring 72 is in a relaxed state, the distance between adjacent convolutions is much greater than during the operative stage of the emitter. This gives the larger particles a chance to flow through the spring and escape during the flushing stage at the start of each irrigation cycle.

In all instances, the orifice disc is made of a resilient material, not only for effecting pressure compensation, but also to provide a flexible positive seating engagement with the knife-edge seat 76. In case a sand particle should lodge on the edge of the seat 76, the disc will seal over the same and prevent leakage.

The capability of conserving the initial supply of water during the flushing stage of the emitters is quite important. As previously mentioned, without this feature, the system would have definite disadvantages and be economically impractical in instances where a substantial number of emitters are connected in the line. The initial supply of water fills the main supply line and is then distributed to the lateral emitter supply lines. The initial supply is usually split, since the pressure system, including the pump and distribution lines, is in a start-up state of delivery. The gradual flow of water into the emitter supply lines must therefore be used in a most efficient manner. In order to cope with this condition, the present emitter is designed so that consecutively arranged emitters in the lateral lines flush progressively. The grouping pattern of actually doing this is a function of the delivery capability factors, such as flow velocity, emitter supply line internal area, and the spacing between the emitters. It is not absolutely essential that the emitters flush and then drip or mist singly or in groups. The system, however, must not require the entire emitter supply line to be filled before the emitters start to flush and function to irrigate. Research work has resulted in an optimum value of emitter flushing and sealing on a low pressure of 0.5 p.s.i. Other emitters require 3 p.s.i. This limits the number of emitters in a line and the length that the line can extend without impractical higher capacity, which raises questions of economic feasibility. The design features of controlled flow of the present emitters utilize the back pressure produced by frictional resistance of the water in the emitter supply line to best advantage to accomplish the highly desirable progressive flushing sequence.

Figure 19:
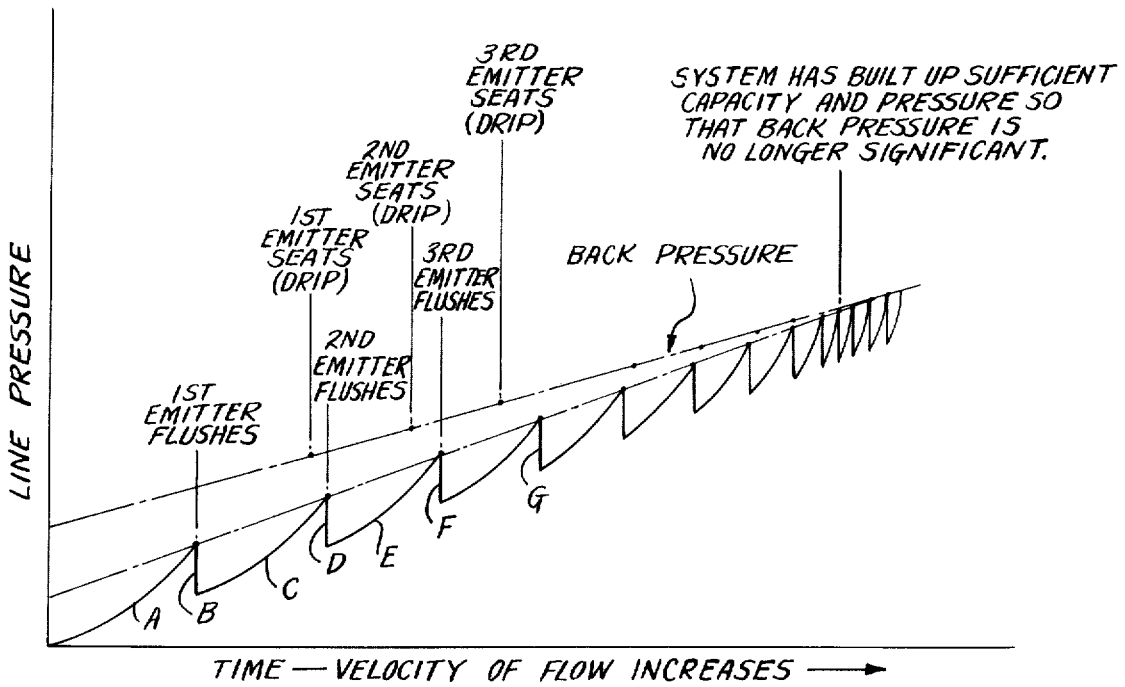
FIG. 19 is a graph diagrammatically illustrating progressive flushing action of a series of emitters when connected in an irrigation line.

FIG. 19 diagrammatically illustrates the progressive flushing action effected by the present basic emitter unit when a series of units is connected at spaced intervals in an irrigation line to drip irrigate. As is shown, as water is supplied to the successive emitters, a back pressure is built up progressively in the emitters before flushing is effected. The manner in which the spring 72, agitator 52 and the tapered wall 26 of the cavity 24 cooperate to create the back pressure within the emitter has been fully explained hereinbefore.

In the diagram, the pressure is plotted as ordinates and the elapsed time as abscissa, the flow velocity increasing as the initial pressure in the line builds up. Thus, pressure builds up in the 1st emitter as indicated by the curve A. As the 1st emitter flushes, a pressure drop occurs, as indicated by the vertical line B. Before the 1st emitter flushes, pressure starts to build up in the 2nd emitter, as indicated by the curve C, and the orifice disc in the 1st emitter, seats to provide drip irrigation before the 2nd emitter flushes and produces a pressure drop, indicated by the line D. About the time that the orifice disc of the 1st emitter seats, and before the 2nd emitter flushes, pressure starts to build up in the 3rd emitter, as indicated by the curve E. Before the 3rd emitter flushes, as indicated by the pressure drop line F, the orifices disc in the 2nd emitter seats for drop irrigation. While the first two emitters are providing drop irrigation, the 3rd emitter flushes, dropping the pressure, as indicated by veritcal line G. The 3rd emitter functions to drip irrigate before the next succeeding emitter flushes, and so on down the line. As is clearly indicated, the emitters do not all start to flush and irrigate at the same time, but progressively and consecutively flush and then irrigate, with the result that substantially less pressure needs to be supplied to the line than would be the case if all of the emitters had to be pressurized and flushed simultaneously.

It will be understood from the foregoing that the present invention provides a basic drip irrigation emitter that can be readily converted to afford alternative desirable functions, or combinations of functions. Thus, the basic emitter unit when provided with an orifice disc having a metering groove, will function as a drip irrigation device. Such unit, upon having a cover, spring and diaphragm pellet added thereto, will also serve as a mister. The basic emitter when provided with an orifice disc devoid of a metering groove, will automatically serve to flush the irrigation line and then shut off. The same type of orifice disc, namely, one without a metering groove, but incorporated in a unit having a cover, a diaphragm pellet and a spring acting on the diaphragm pellet, will function as a mister only. Additionally, if an orifice disc is substituted in the last-mentioned unit for the plain disc, and is provided with a plurality of radial metering grooves of a total cross-sectional area equal to that of the misting notches in the end of the discharge orifice, the device will function as a unlimited-pressure mister.

It will be further understood that various changes may be made in the details of design and arrangement of the parts of the emitters disclosed herein without departing from the principles of the invention or the scope of the annexed claims.

I claim:

1. An irrigation emitter, comprising: a housing having a cylindrical wall with an inlet opening extending therethrough adjacent one end thereof, said housing also having an axially extending discharge nozzle spaced from said inlet opening; a valve seat surrounding the inner end of said nozzle; a valve disc in said housing having one side thereof engageable with said seat, said valve disc having a metering groove in the seating side thereof, said groove serving as an orifice when the valve disc is seated, said valve disc being formed of resilient, deformable material so that when said valve disc is seated, the cross-sectional area of said orifice will vary in accordance with the changes in pressure acting on the non-seating side of said valve disc and maintain a uniform rate of flow through the emitter, regardless of variations in the pressure acting on said disc.

2. An irrigation emitter as claimed in claim 1, wherein the metering groove is generally triangular in cross-section.

3. An irrigation emitter as claimed in claim 1, wherein the valve seat has a knife-edge engageable by the valve disc.

4. An irrigation system comprising: an irrigation line; at least one emitter connected in said irrigation line, said emitter comprising a cylindrical housing arranged parallel with said irrigation line and having an axial outlet; an extension projecting tangentially relative to said housing and connecting said housing with said irrigation line, said extension having a passage extending therethrough communicating with said irrigation line at one end and with the upper portion of the interior of the housing at the other end, said emitter being connected with said irrigation line so that said extension projects upwardly on an angle from said irrigation line, whereby back-flow through said passage is prevented when the supply of water to the irrigation line is shut off.

5. An irrigation emitter to be connected in an irrigation line, comprising: a cylindrical housing having an inlet for the introduction of water at one end, a discharge nozzle at its other end and a sediment collecting cavity between said inlet and said discharge nozzle; valve means in said housing controlling the flow of water through said nozzle; means connected with said valve means and movable axially in said housing in response to pressure and flow through said housing and arranged to initially partially obstruct flow and build up a back pressure in said housing; means in said housing cooperable with said valve means for suddenly releasing said back pressure upon predetermined axial movement of said valve means to effect flushing of said cavity; and additional valve means carried by said movable means operable after flushing to control the flow of water through said nozzle at a metered rate.

6. An irrigation emitter as claimed in claim 5, wherein the axially movable means connected with the valve means is an agitator and includes blades for effecting rotation thereof by the water introduced into the housing.

7. An irrigation emitter as claimed in claim 6, wherein the water is introduced into the housing at a point eccentric to the axis of the housing causing the same to flow in a spiral path and rotate the agitator.

8. An irrigation emitter, comprising: a housing having a cylindrical wall with an inlet opening extending therethrough adjacent one end of said housing; a plug closing said one end of said housing and having a side wall provided with a notch registrable with said inlet opening to control the rate of flow of water into said housing, said housing having a transverse wall axially spaced from said one end of said housing and cooperating with said plug to form a sediment cavity, said transverse wall having a hollow axially extended portion forming a discharge nozzle with an annular seat at the inner end of said discharge nozzle; an agitator rotatably mounted in said cavity and being axially movable therein, said agitator having a circular wall and a plurality of vanes extending therefrom toward said plug being arranged to effect rotation of said agitator in response to the flow of water through said cavity, said agitator including an extension projecting axially from said circular wall and into said discharge nozzle; a flow control valve mounted on said extension and cooperating with said nozzle for controlling the flow of water through said nozzle; a compression spring in said cavity having one end engaged with said circular wall of said agitator and its other end engaged with said transverse wall of said housing and surrounding said seat; and a valve disc mounted upon said extension of said agitator and axially movable into engagement with said seat.

9. An irrigation emitter as claimed in claim 8, wherein the inner surface of the housing wall forming the sediment chamber is tapered inwardly in a direction away from the plug, and the outer periphery of the circular wall of the agitator cooperates with said tapered wall to reduce the clearance area therebetween as the agitator is moved axially, whereby to increase the back pressure in the sediment chamber in accordance with the axial movement of the agitator.

10. An irrigation emitter as claimed in claim 8, wherein the outer edges of the vanes of the agitator are inclined relative to the axis of the agitator to facilitate rotation of the agitator.

11. An irrigation emitter as claimed in claim 8, wherein the inlet opening of the housing is eccentric to the axis of the sediment cavity.

12. An irrigation emitter as claimed in claim 8, wherein the plug is rotatably adjustable to vary the position of its notch relative to the inlet opening to control flow into the housing.

13. An irrigation emitter as claimed in claim 12, wherein the plug also has a wall concentric with its notched wall to provide an annular channel in the plug for imparting a rotary flow pattern to the water introduced into the housing through the eccentric inlet opening to thereby cause rotation of the agitator.

14. An irrigation emitter as claimed in claim 8, wherein the seat surrounding the discharge orifice is in the form of a knife edge.

15. An irrigation emitter as claimed in claim 14 wherein the valve disc has a generally radially disposed metering groove in the face thereof which engages the knife-edge seat.

16. An irrigation emitter as claimed in claim 15, wherein the metering groove in the valve disc is triangular in cross-section, and the valve disc is formed of resilient pressure-deformable material so that when the valve disc is seated, the cross-sectional area of the metering groove will decrease as the water pressure in the sediment cavity increases to proportionally reduce the rate of flow into the discharge nozzle as the pressure in the cavity varies.

17. An irrigation emitter as claimed in claim 8, wherein the valve disc has a plain face which engages the valve seat.

18. An irrigation emitter as claimed in claim 8, wherein the inner surface of the wall of the discharge nozzle has an inwardly projecting annular ridge, and the flow control valve on the agitator is arranged to cooperate with said ridge to control the initial rate of flow of water through said nozzle.

19. An irrigation emitter as claimed in claim 18, wherein the flow control valve has a cylindrical end portion with a sliding fit in the annular ridge and wherein said flow control valve has longitudinal channel means extending inwardly from said cylindrical end portion and along which water can flow when the flow control valve is moved to a position in which the cylindrical end portion is disposed outwardly of said annular ridge.

20. An irrigation emitter as claimed in claim 8, including a cover enclosing the nozzle, said cover having at least one discharge opening formed therein.

21. An irrigation emitter as claimed in claim 8, wherein the outer end of the discharge nozzle has a seat formed thereon and wherein said last-mentioned seat has at least one orifice notch formed therein, and including additionally a mist valve having a conical wall portion engageable with said notched seat and having guide means extending therefrom into the discharge orifice; a cover mounted on the housing enclosing said mist valve and having an opening through which mist can be discharged; and a compression spring disposed between said cover and said mist valve, urging said mist valve toward said notched seat.

22. An irrigation emitter as claimed in claim 8, wherein the valve disc has a metering groove of a cross-sectional area at least as great as that of all of the notches in the notched valve seat.

23. An irrigation emitter as claimed in claim 8, wherein the valve disc has a plurality of metering grooves whose aggregate cross-sectional area is at least as great as that of the total cross-sectional areas of the notches in the notched valve seat.

24. An irrigation emitter as claimed in claim 8, wherein the compression spring has a sufficient number of convolutions such that they are very close together when the valve disc is seated and function as a strainer.

* * * * *